Dec. 6, 1927.  
G. W. ALDEEN  
1,651,353  
PORTABLE WINDSHIELD CUTTER  
Filed Feb. 15, 1924   2 Sheets-Sheet 1
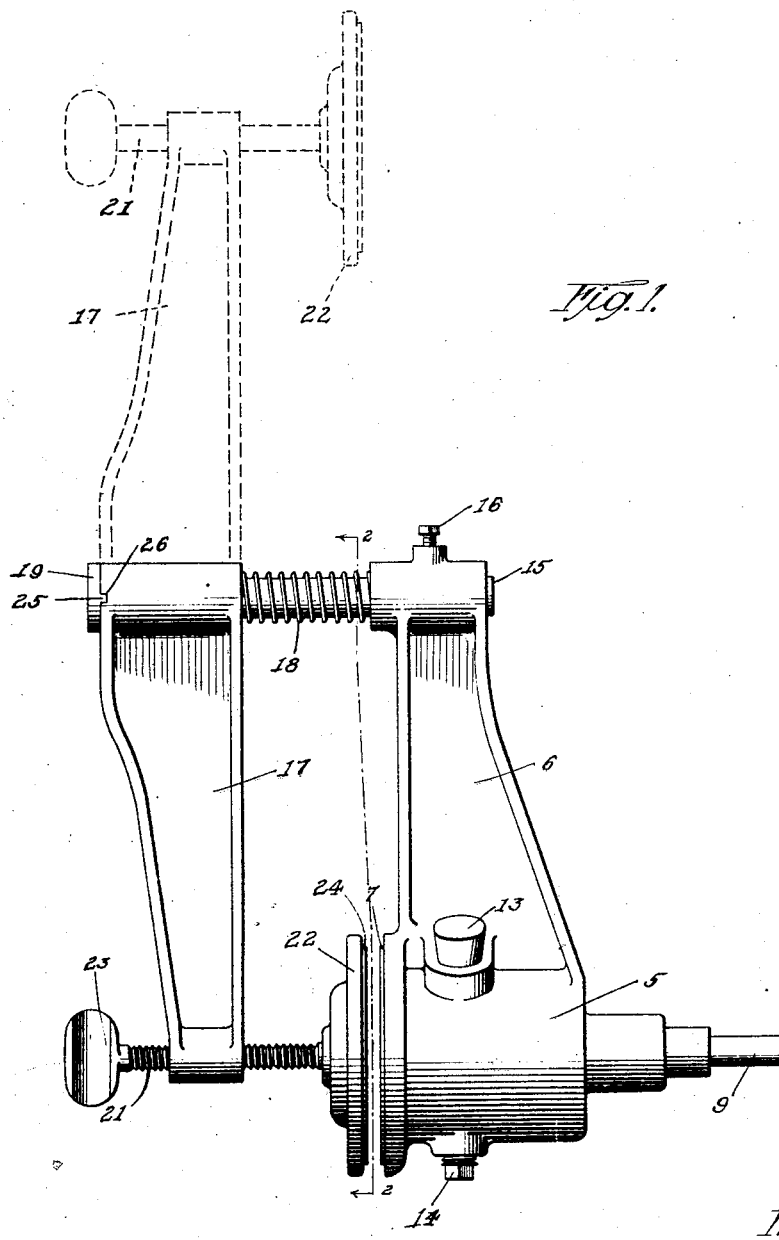

Dec. 6, 1927.  
G. W. ALDEEN  
1,651,353  
PORTABLE WINDSHIELD CUTTER  
Filed Feb. 15, 1924  
2 Sheets-Sheet 2
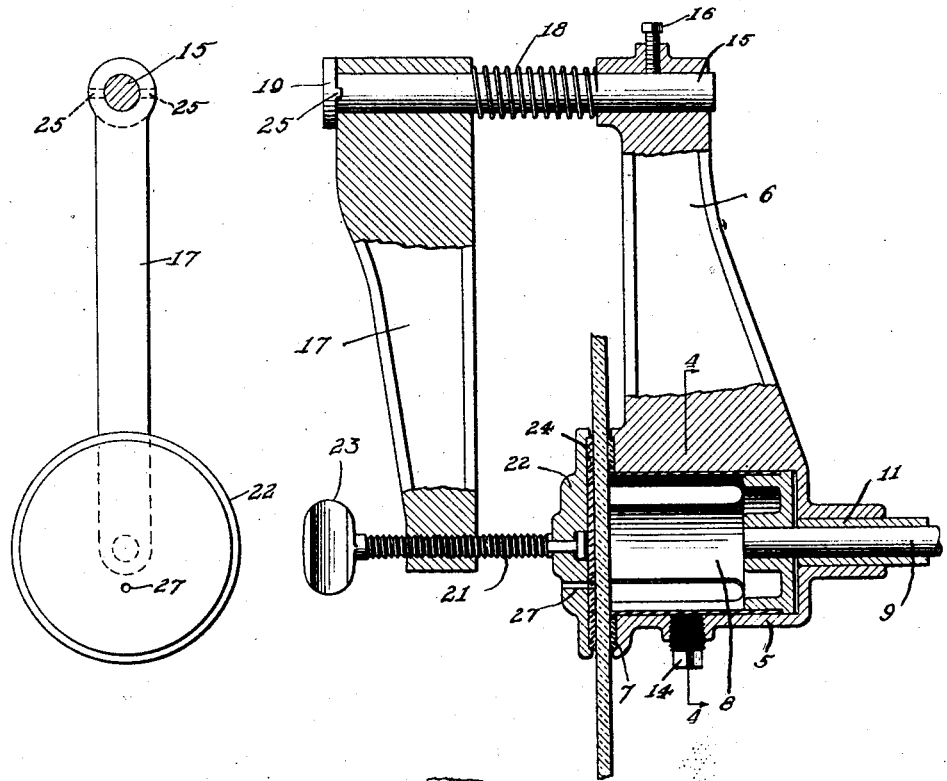
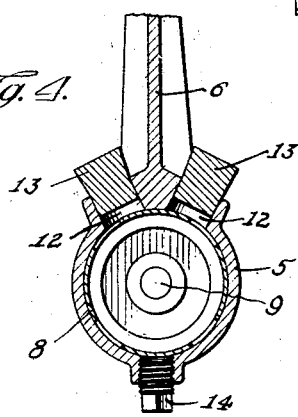
Inventor  
Gedrv W. Aldeen  
By Wilson & McCanna  
Attys.

Patented Dec. 6, 1927.

1,651,353

UNITED STATES PATENT OFFICE.

GEDOR W. ALDEEN, OF ROCKFORD, ILLINOIS, ASSIGNOR TO FYRAC MANUFACTURING CO., OF ROCKFORD, ILLINOIS, A CORPORATION OF ILLINOIS.

PORTABLE WINDSHIELD CUTTER.

Application filed February 15, 1924. Serial No. 692,977.

This invention relates to portable glass cutters of the kind adapted for cutting round holes in plate glass, and especially for cutting such holes in windshields, the purpose of which is to allow an accessory, such for example as a spotlight, to be inserted and mounted on a windshield.

The primary object of the present invention is to provide an improved glass cutter of this class, which may be easily and conveniently attached to or clamped on a windshield or any plate of glass or the like, in position for cutting therethrough a round hole of fairly large diameter, and which when properly applied, will be securely held in operative position thereon, so that the cutter will not be displaced from the set position, or after commencing the cutting operation.

A further purpose is to provide a glass cutter of the character described comprising but comparatively few parts so constructed as to permit manufacture thereof at a comparatively low cost and to function in a practical and efficient manner for the purposes intended.

Other objects and attendant advantages will be appreciated by those skilled in this art as the invention becomes better understood by reference to the following description when considered in connection with the accompanying drawing, in which—

Figure 1 is a side elevation of a glass cutter embodying my invention;

Fig. 2 is a section taken on the line 2—2 of Fig. 1;

Fig. 3 is a longitudinal sectional view through the glass cutter showing it in operative position on a plate of glass; and Fig. 4 is a section taken on the line 4—4 of Fig. 3.

In this class of cutters, a hollow head is supported against one face of the glass so as to make liquid-tight engagement therewith, a hollow rotary cutter is mounted in the head and adapted to be pressed against the glass while rotating for performing the cutting operation by an abrading action, and a clamping part is employed for engaging the opposite side of the glass for holding the hollow head in position thereon.

According to the present invention, said hollow head and clamping part are carried or held in co-operative relation by a yoke-like frame, the arms of which may be relatively moved for bringing said hollow head and clamping part into and out of operative relation and for positioning the cutter on a windshield or other piece of material to be cut. At present, the hollow head designated generally by 5, is cast integrally with an arm 6 forming part of the supporting frame. This head, cylindrical in cross-section, has an open end faced by a cushion gasket 7 of rubber or any suitable resilient material adapted to seat against the glass and provide liquid-tight engagement therewith.

A hollow rotary cutter 8 journaled in the hollow head is adapted to be revolved by means of a driving shaft 9 journaled in a bearing 11 in the end of the head opposite from said open end. This shaft may be driven by any suitable means, and inasmuch as the cutter is portable and intended primarily for use in cutting holes through windshields, it is the general practice to employ a small portable motor-driven chuck for driving this shaft.

The abradant and liquid may be inserted into the head through one or more openings 12 therein, normally closed by plugs 13; and the liquid-abrading material may be drained from the head by removing a drain plug 14. The abradant will be picked up by the revolving cutter, which preferably is cut away longitudinally, providing a plurality of blades, and will be worked into the glass by the cutter blades so as to cut a narrow circular hole through the glass by an abrading or grinding action.

The outer end of the support or arm 6 is bored for the reception of a rod or post 15, which is fixedly secured to said support by a set screw 16. This post is parallel with the axis of rotation of the cutter and extends beyond the open end 5 of the hollow head. On said extended end of the post is mounted a clamping member or arm 17 free to move lengthwise and rotatably thereon. A coiled expansion spring 18 on the post between the arms 6 and 17, tends to separate them and to urge the latter outwardly against a stop or head 19 on the extended end of the post. A screw 21 threaded through the free end of the arm or clamping member 17 equi-distant with the cutter from the post 15, is equipped at one end with a clamping part 22 and at its opposite end with a thumb piece or head 23 for turning the screw. The clamping part 22, preferably circular in form and so connected with the screw as to move lengthwise therewith but to permit the screw to turn in it, is equipped with a cushion glass-engaging surface 24, preferably of rubber or some composition or fabric including rubber.

This device may be positioned on a plate of glass with the arms 6—17 straddling the glass and the clamping part 22 in coaxial relation to the cutter, as shown in Fig. 3. Means is provided for positively locating the parts in this operative relation, comprising in the above instance, diametrically opposed locating bosses 25 on the head 19 adapted to enter complemental recesses 26 in the inner end of the arm 17. It will be manifest that inasmuch as the spring 18 constantly urges the arm 17 against the stop 19, the lugs 25 and recesses 26 will be engaged one with the other when brought into registration by swinging the arm 17 rotatably upon and about the post 15. These locating parts will be brought into registration for determining both an operative and an inoperative position of the clamping arm 17, the operative position being shown in full lines with the clamping parts 22 in coaxial relation with the cutter and the inoperative position being shown in dotted lines in Fig. 1 with the arm 17 diametrically opposite from its operative position.

When mounting the device on a windshield, the opposed parts to be clamped thereto may thus be quickly and easily brought into correct operative relation, and by turning the screw 21 these parts, namely, the cutter-carrying head and the clamping part 22, may be firmly clamped against the opposite sides of the interposed windshield glass. The cutting operation may then be performed in the manner well known in this art.

In addition to the structural features already described, my invention also provides visible means for indicating when the cutting operation is completed. This consists in providing a small hole 27 through the clamping part 22 and its cushion face 24 near the bottom of the cutter compartment, so that when the glass has been cut through the abradant will flow out through the hole 27, thus indicating the completed cut.

The interlocking faces between the arm 17 and post 15 are also desirable as a means for holding the arm 17 in fixed relation to the other arm 6 of the frame structure both when handling the device and when installing it on a windshield.

It is believed that the foregoing clearly illustrates the objects prefaced above, and while I have shown but a single working embodiment of my invention, it should be understood that many changes might be made in details of construction without departing from the spirit and scope of the invention as expressed in the appended claims.

I claim:

1. A cutter of the character described, comprising a supporting arm having a hollow head on one end open towards the material to be cut and adapted to be clamped thereagainst, a cutter rotatable in the head, a post fixed to the opposite end of said arm, parallel with the cutter axis and extending beyond said open end of the head, a clamping arm mounted on said extended end of the post to slide lengthwise and rotatably thereon, a stop for limiting outward movement of said clamping arm on the post, a screw threaded through the free end of said clamping arm in coaxial relation to the cutter, and a clamping part adapted to be forced by said screw against the side of the material opposite from that engaged by the cutter head for clamping said head against the material.

2. A cutter of the character described, comprising a support having a hollow head open toward the material to be cut and adapted to be clamped thereagainst, a cutter rotatable in the head, a post fixed on the support, parallel with the axis of the cutter and extending beyond the open end of the head, a clamping arm mounted on said post for movement lengthwise and rotatably thereon, a coiled spring on the post normally urging the clamping arm away from the support, a stop on the post for limiting such movement of the clamping arm, a screw threaded through the free end of said clamping arm in substantially coaxial relation to the cutter, and a clamping part on said screw adapted to be clamped to the face of the material opposite from that clamped by said head.

3. A cutter as set forth in claim 2, in which said stop on the post and the face which it engages on the clamping arm are so shaped as to hold said arm with its clamping part in said coaxial relation to the cutter and permits the clamping arm when its clamping part is withdrawn, to be swung on the post out of operative position.

4. A cutter as set forth in claim 3, in which said faces are so shaped as to hold the clamping arm either in said operative position or in an inoperative position.

5. A cutter of the character described comprising a hollow head open toward the material to be cut and adapted to be clamped thereagainst, a cutter rotatably mounted in the head, and means for clamping said head against the material including a clamping part in co-axial relation to the head and adapted to be clamped against the side of the material opposite from the head, said head being adapted to hold a liquid abradant, and said clamping part having a normally open passage through which said abradant is adapted to flow when a cut has been completed.

6. A cutter comprising a hollow head open at one end and adapted to be clamped against the material to be cut, a cutter rotatable in said head, a clamping device engaging such material in opposed relation to said cutter head, and means for introducing an abradant to the cutter head, said clamping device having an indicating passage normally open during the cutting operation of said clamping member for permitting the discharge of the abradant when a cutting operation has been completed.

7. A cutter comprising a cutter head open at one end, a rotatable cutter therein, means for feeding an abradant to the head, a clamping device positioned in opposed relation to said head, a sheet of material disposed between said clamping device and the cutter head, and means for feeding an abradant to the cutter head, said clamping device having a discharge normally open permitting the discharge of the abradant from the cutting head when a cutting operation has been completed.

8. A cutter, comprising a supporting arm having a hollow cutter head open at one end toward the material to be cut, a rotatable cutter in said head, an element connected with said arm, a clamping arm disposed parallel with the arm and swingingly mounted on said element, a clamp carried by said arm and adapted to be positioned opposite the cutter head, means for limiting the movement of the clamping arm on said element, said means also positioning the clamping arm whereby the clamp directly underlies the cutter head.

9. A portable cutting tool, comprising a supporting arm having a hollow head at one end thereof open toward the material to be cut and adapted to be clamped thereagainst, a rotary cutter in said head, a post connected with said arm at its outer end and extending therefrom, a clamping arm swingingly mounted on said post and spaced from said first-mentioned arm, a clamping device carried by said clamping arm, and cooperating means carried by the post and clamping arm for limiting the swinging movement of the clamping arm.

10. A portable cutting tool, comprising a supporting arm having a hollow head at one end thereof open toward the material to be cut and adapted to be clamped thereagainst, a rotary cutter in said head, a post connected with said arm at its outer end and extending therefrom, a clamping arm swingingly mounted on said post and spaced from said first-mentioned arm, a clamping device carried by said clamping arm, cooperating means carried by the post and clamping arm for limiting the swinging movement of the clamping arm, said means comprising a detent in the clamping arm, a lug on the post, and a yieldable element exerting an outward pressure on the clamping arm, substantially as described.

11. In a cutting tool of the character described, the combination with an arm having a head at one end open toward the material to be cut and adapted to be clamped to such material, a rotating cutter in said head, a post extending from said arm, a clamping arm swingingly mounted on said post and spaced from said first-mentioned arm, and a clamping device carried by said clamping arm.

GEDOR W. ALDEEN.